(12) United States Patent
Krueger et al.

(10) Patent No.: US 10,558,647 B1
(45) Date of Patent: Feb. 11, 2020

(54) HIGH PERFORMANCE DATA AGGREGATIONS

(71) Applicant: Amazon Technologies, Inc., Seattle, WA (US)

(72) Inventors: Chelsea Celest Krueger, Seattle, WA (US); Alex Leighton, Seattle, WA (US); Daniel Pincas, Edgewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 15/395,115

(22) Filed: Dec. 30, 2016

(51) Int. Cl.
*G06F 17/30* (2006.01)
*G06F 7/00* (2006.01)
*G06F 16/23* (2019.01)
*G06F 16/27* (2019.01)
*G06F 16/22* (2019.01)

(52) U.S. Cl.
CPC ...... *G06F 16/2379* (2019.01); *G06F 16/2246* (2019.01); *G06F 16/278* (2019.01)

(58) Field of Classification Search
CPC ......... G06F 17/30528; G06F 17/30011; G06F 17/30554; G06F 16/2379; G06F 16/278; G06F 16/2246

USPC ......................................................... 707/703
See application file for complete search history.

(56) References Cited

U.S. PATENT DOCUMENTS

| | | | | |
|---|---|---|---|---|
| 5,717,919 | A * | 2/1998 | Kodavalla | G06F 16/2282 |
| 6,839,680 | B1 * | 1/2005 | Liu | G06Q 30/0204 |
| | | | | 705/7.33 |
| 2005/0102297 | A1 * | 5/2005 | Lloyd | H04L 29/12132 |
| 2009/0234710 | A1 * | 9/2009 | Belgaied Hassine | G06Q 30/02 |
| | | | | 705/7.29 |
| 2011/0295722 | A1 * | 12/2011 | Reisman | G06Q 30/0201 |
| | | | | 705/27.1 |
| 2014/0244788 | A1 * | 8/2014 | Resch | H04L 67/1097 |
| | | | | 709/217 |

\* cited by examiner

*Primary Examiner* — Kuen S Lu
(74) *Attorney, Agent, or Firm* — Thomas | Horstemeyer, LLP (57) ABSTRACT

A data aggregations application is disclosed that can create data aggregations from transaction data reported by an upstream system. Data aggregations that are interrelated to one another are generated. The transaction data can be stored only in leaf nodes with transaction idempotency maintained. Parent nodes can be dependent upon the leaf nodes so that transaction is not required to be stored in the parent nodes.

20 Claims, 7 Drawing Sheets

HIGH PERFORMANCE DATA AGGREGATIONS

BACKGROUND

Creating data aggregations can be a processing intensive operation. For example, aggregations or collections of transactions that are grouped by time period or another categorization may seem to be a logically simple operation. However, maintaining data aggregations over large datasets or for a large number of users can require significant processing and storage resources, which can result in significant expense. As one example, suppose transactions for a large number of users are housed in a data store. These users might request or desire the aggregate data for their transactions across various levels of granularity. For example, some users might desire aggregate data on a per-hour basis, a per-day basis, and a per-week basis. When a particular transaction is processed and stored in a data warehouse, each of these aggregations is affected and must be updated. Additionally, idempotence should be maintained across all of the aggregations as well. Accordingly, maintaining data aggregations presents a significant challenge for transaction processors and data warehousing providers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application is directed to processing and storing transactions that are associated data aggregations. A data aggregation represents a collection of data from transactions associated with a particular variable, such as a time period. Other examples of variables over which data can be aggregated include a transaction type, a tag applied to transactions, or any other categorization of data. For example, transactions associated with product sales might be associated with a timestamp corresponding to when the transaction occurred. Users may wish to view or otherwise group data into certain aggregations, such as transactions occurring within a particular hour, a particular day, week, year, etc.

As another example, transactions can be grouped into another hierarchical taxonomy and subsequently aggregated over various categories defined within the taxonomy. For example, suppose that transactions identified items within an item catalog. Transactions can be grouped into the most granular category into which the item fits, and the categories of the items can be organized into progressively larger categories within the taxonomy. An item can be identified by its item identifier, and a collection of item identifiers can be collected into a category, such as "small cameras." The "small cameras" category can be grouped into a larger category such as "cameras," which can be grouped along with other categories into "electronics," and so on.

Data aggregations can be desirable for reporting purposes, data visualization purposes, or generating periodic reports regarding transactions. For example, a user might wish to generate a report regarding sales volume for their account over a particular day, quarter, or year. As another example, a user might wish to generate a report regarding sales volume of a particular transaction type or transaction category over a particular hour within a day. In these scenarios, the user might with to generate a report that includes a data aggregation, which can be based on a summation of particular data fields occurring within the desired time period. In other words, in one example, the user might want to view a report that is based on total sales in a particular hour or week. Data aggregations can be generated over any time period that a user or an administrator may require for analytics, reporting, or other purposes.

In other examples, aggregations can be created based upon a transaction count, a transaction rate, or minimum or maximum bounded values. For example, a transaction rate over a particular time period or categorized by a particular parameter can be generated. An aggregation can be defined by any calculation or assessment of how data should be aggregated, averaged, totaled or collected according to any other statistical measure.

In some systems, to generate such a report of transactions occurring in a particular time period, a process or service might have to query a transaction database or data store in which all transactions are stored. The query against the transaction database might be for transactions that occur in a particular hour of a particular day. The query run against the transaction database might require a query service to identify the data occurring within the hour from all of the transactions stored in the transaction database. This can be a costly operation in terms of computing or processing resources. Additionally, a user might wish to view a report of transactions occurring within an hour and then view another report of transactions occurring within a particular week. Generating each report might require a query service to run separate costly queries against a transaction database.

Additionally, generating each report each time it is requested by a user might require a system to evaluate all transaction data each time the report or requested. Additionally, in other systems, pre-computation of the reporting might be attempted, but another factor is the lack of a mechanism to guarantee the accuracy of what's been pre-computed.

Figure 1A:
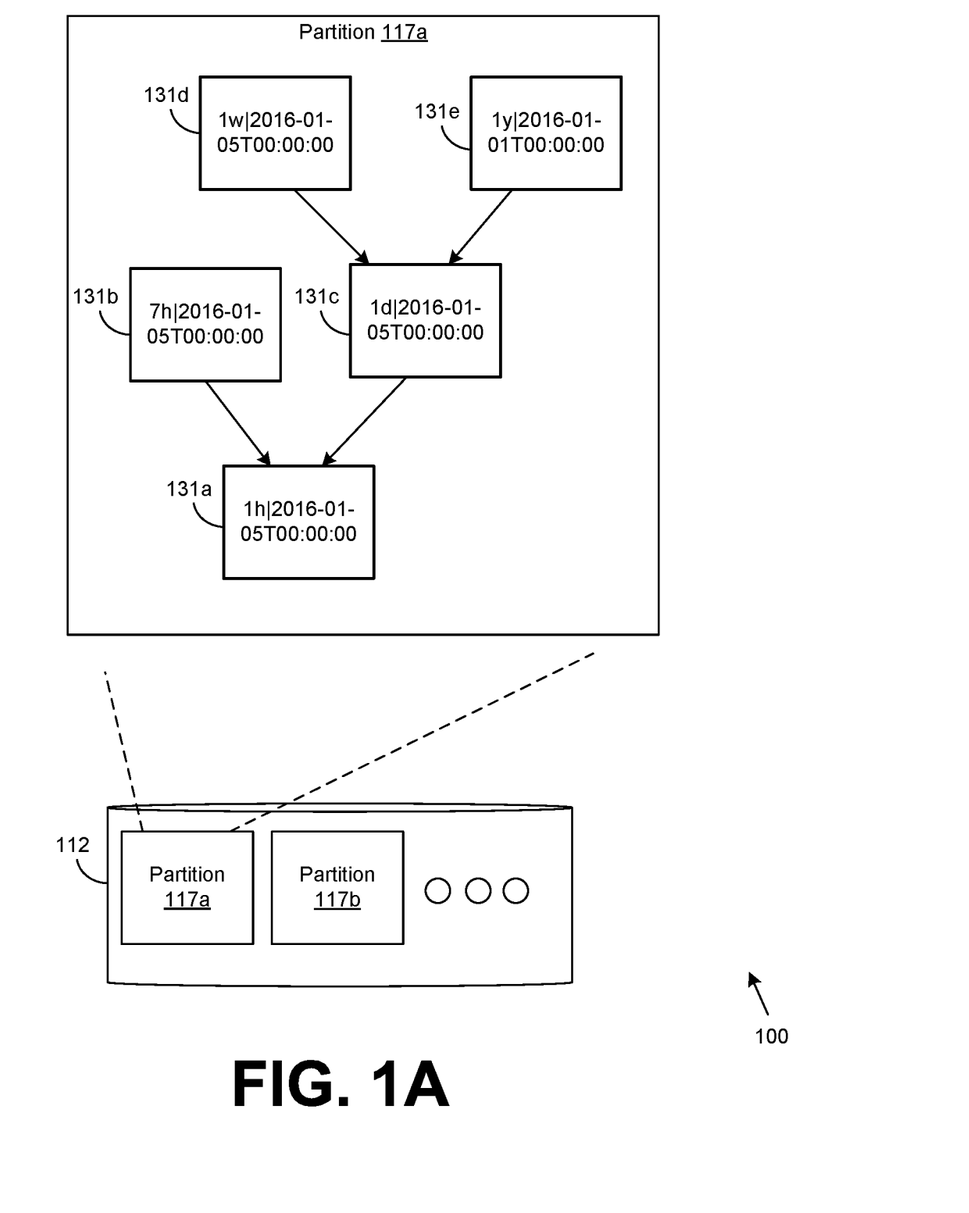
FIG. 1A is a pictorial diagram illustrating a scenario according to one example of the disclosure.

Accordingly, examples of the disclosure can create data aggregations that build upon one another to improve the efficiency and performance of generating aggregated data from individual transactions. With reference to FIG. 1A, shown is an example scenario 100 according to one example of the disclosure. The scenario 100 of FIG. 1A illustrates one approach to storing transactions and relating data aggregations to one another according to examples of the disclosure. In FIG. 1A, transactions can be stored into various partitions 117 in a data store. A partition 117 can allow data to be segmented according to user account, transaction type, a hash value, or any other variable on which data is separated into partitions. In one sense, a partition 117 can also be thought of as a table or one or more tables within a data store.

The depicted data store 112 can be a separate data store 112 from a primary transaction database employed by a transaction processor or other system in which transactions are stored or archived. In some examples, the data store 112 can represent the transaction database of a transaction processor.

Therefore, according to examples of this disclosure, a particular partition 117, such as partition 117a, can be arranged into various nodes or data aggregations 131. In one example, a user or administrator can configure the partition 117a to include aggregations 131 specified by various quanta of time. For example, transactions occurring within a particular hour can be bucketed into one aggregation 131 and transactions occurring within another hour can be bucketed into a different aggregation 131 if the user or administrator configures the partition 117 to include hourly data aggregations 131.

Similarly, transactions occurring within a particular day are bucketed into a particular aggregation 131 and transactions occurring on the next day are bucketed into another aggregation 131. The data aggregations 131 can be defined with a particular time window and a start time. For example, an hourly aggregation 131 can specify a time period of one hour and a starting time specified by a particular timestamp. The hourly aggregation 131 would then include transactions that occur within the hour that falls within the time period defined by the aggregation 131. In one example, the start time and time window can be identified by an ISO 8601 representation of a timestamp and a time interval.

Returning to FIG. 1A, aggregations 131a-131e are shown. The aggregations 131 in FIG. 1 can be logically interconnected in a tree data structure or any other hierarchical data structure. Aggregation 131a is considered a leaf node because he does not reference a child node. In other words, it only has parent nodes. An aggregation 131 that is a leaf node represents the smallest quanta of time defined by any of the aggregations 131 in the partition 117. For example, if the smallest data aggregation 131 allowed or configured for the partition 117 is hourly data aggregations 131, the hourly aggregations 131 represent the leaf nodes of the partition 117.

An aggregation 131 is referenced by a parent aggregation 131 when the parent aggregation 131 specifies a time period that is a multiple of the aggregation 131 and when the start time overlaps with or falls within the parent aggregation 131. For example, aggregation 131a is defined by a time period of one hour and a start time defined by the depicted timestamp. The aggregation 131a is referenced by parent aggregations 131b and 131c. Aggregation 131b is defined by a time period of seven hours and, in this example, the same start time as aggregation 131a. The time period is a multiple of the time period of aggregation 131a. Similarly, aggregation 131c is defined by a time period of twenty-four hours, or one day. The time period of aggregation 131c is also a multiple of aggregation 131a.

Continuing the example of FIG. 1A, aggregations 131d and 131e reference or are parent nodes of aggregation 131c. The time period of aggregation 131d is one week, or seven days, which is a multiple of the one day time period of aggregation 131c. Similarly, the time period of aggregation 131e is one year, or 365 days, which is a multiple of the one day time period of aggregation 131c. In the case of a one year time period, embodiments of the disclosure can be configured with leap year logic to account for leap years.

Additionally, aggregations 131 can be arranged such that they reference a child aggregation 131 for which their respective time periods are the closest possible multiple. Therefore, in the example of FIG. 1A, the aggregation 131d would not directly reference aggregation 131a even though the time period of aggregation 131d is a multiple of the time period of aggregation 131a.

Now that the logical relationship of aggregations 131 within a partition has been described, a discussion of how transaction data can be arranged within the partition 117a follows. Data pertaining to particular transactions, or source data, can be stored in the aggregations having the lowest configured granularity level. In other words, the aggregations within a partition 117a having the smallest time period can house particular transaction data. In the example of FIG. 1A, aggregation 131a can store the transaction data regarding transactions in the partition 117a. The aggregation 131a can also store aggregated data regarding the individual transaction data stored in the aggregation 131a. The aggregated data can include summed or totaled values for one or more fields within the transaction data. For example, the aggregated data can include a total amount of sales when the individual transactions pertain to individual sales.

The parent aggregations 131 of aggregation 131a would not house the data regarding individual transactions. Instead, the parent aggregations 131 of aggregation 131a house the aggregated data from aggregation 131a and any of their other children aggregations 131. In this way, it is unnecessary to store individual transaction data within all of the aggregations 131 in the partition 117. Additionally, in order to generate a report of a particular day's sales volume, only the aggregation 131 pertaining to that day should be referenced or queried rather than individual transaction data.

Figure 1B:
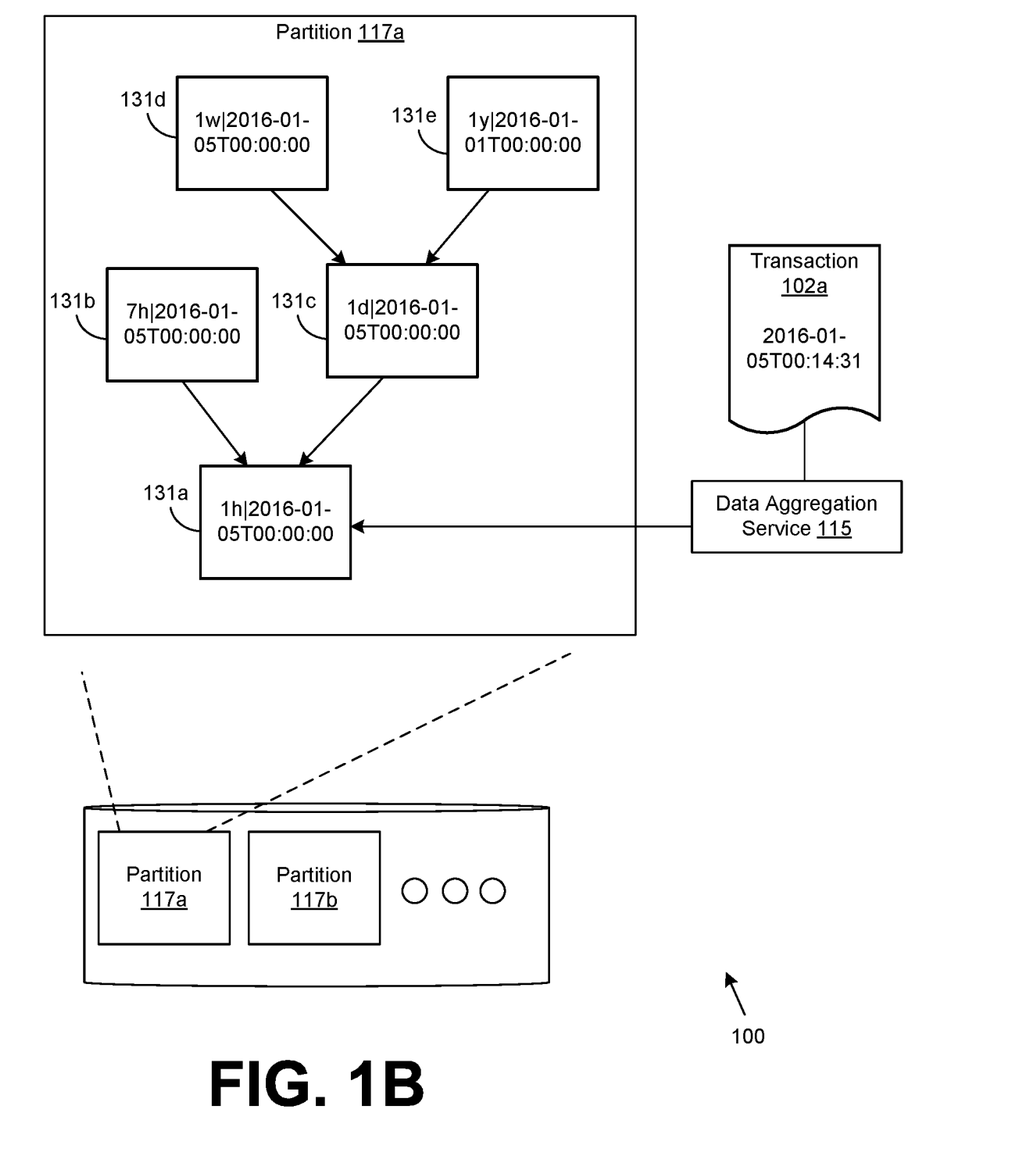
FIG. 1B is a pictorial diagram illustrating a scenario according to one example of the disclosure.

Continuing the example of FIG. 1A, reference is now made to FIG. 1B, which illustrates how individual transaction data can be inserted into the partition 117. A transaction 102 can be associated with a particular timestamp as illustrated. Accordingly, the timestamp can be evaluated by the data aggregation service 115 to identify which of the leaf nodes, or aggregations 131 having the smallest time period, in the partition 117 that the transaction 102 should be stored. In the depicted example, because the timestamp falls within the time period and start time of aggregation 131a, the transaction 102 can be stored there. Additionally, in some examples, upon storing the transaction 102, the data aggregation service 115 can update calculations of the aggregated data for the aggregation 131a and all of the parent aggregations 131b-e that reference the aggregation 131a.

Figure 1C:
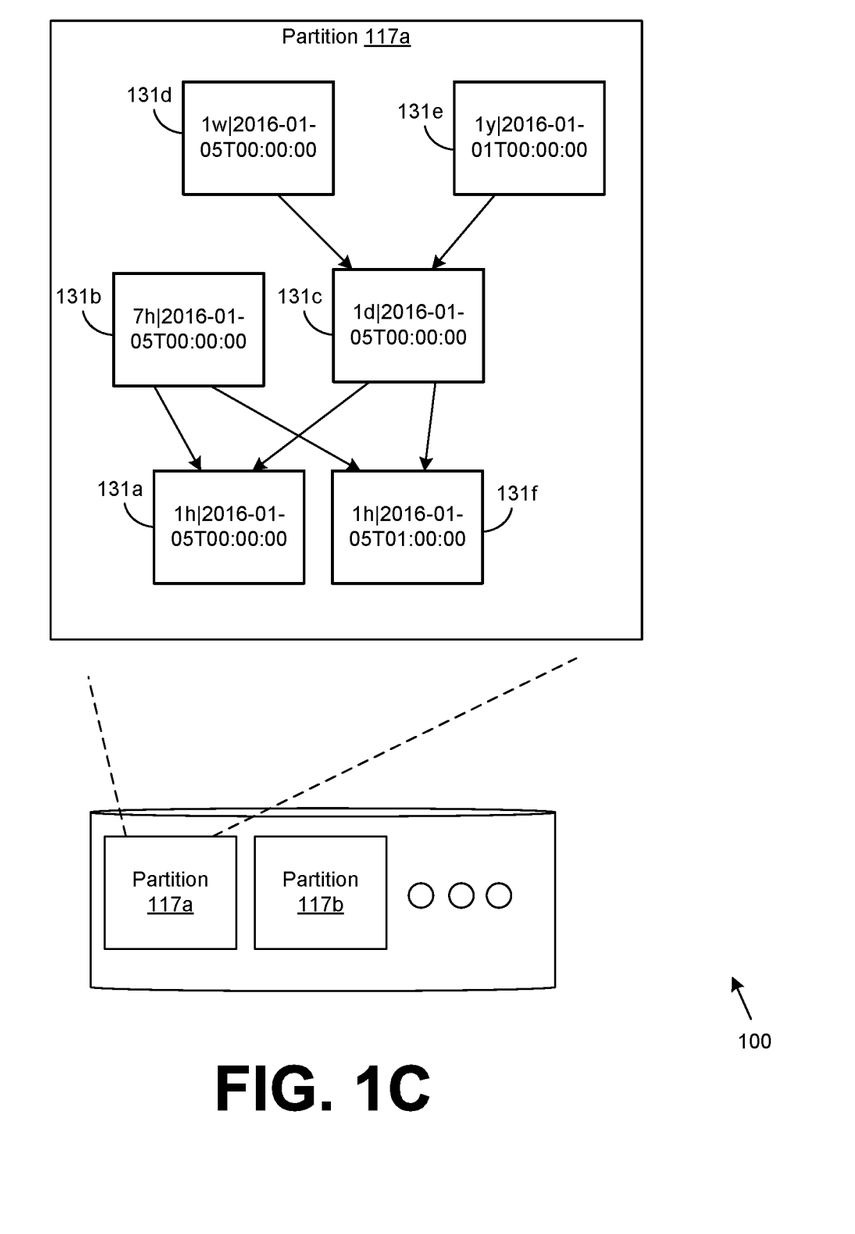
FIG. 1C is a pictorial diagram illustrating a scenario according to one example of the disclosure.

Referring next to FIG. 1C, the partition 117a is shown with an additional aggregation 131f. Aggregation 131f can be created by the data aggregation service 115 when the current time no longer corresponds to the time period defined by any leaf node or when a new transaction is received that does not correspond to the time period defined by any leaf node. Accordingly, aggregations 131b and 131c, which are the immediate parent nodes of the aggregation 131f, reference both aggregation 131a and 131f. Accordingly, as additional child aggregations 131 are created, the closest parent aggregations 131 can be updated to reference the new aggregation 131f. Additionally, the aggregated data within the parent aggregations 131 can also be updated to account for the new aggregation 131*f*.

Figure 1D:
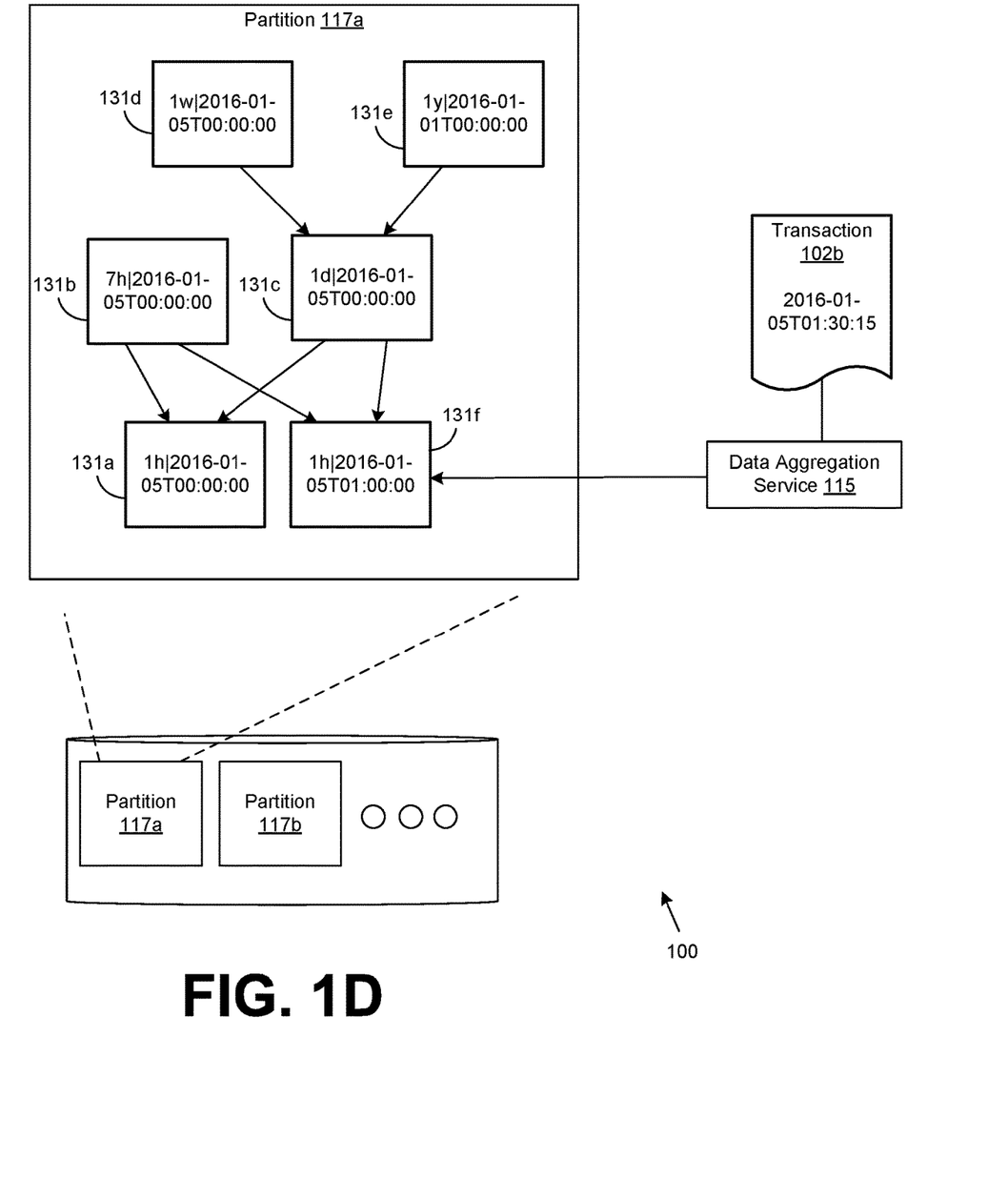
FIG. 1D is a pictorial diagram illustrating a scenario according to one example of the disclosure.

Referring to FIG. 1D shown is an example of how a new transaction 102*b* can be stored in the partition 117*a*. In this example, the timestamp of the transaction 102*b* corresponds to the time period defined by aggregation 131*f* In some examples, the data aggregation service 115 would determine whether the timestamp of the transaction 102*b* corresponds to a leaf node and generate the new aggregation 113*f* in response to the timestamp failing to correspond to the time period defined by any other leaf node within the partition 117*a*.

Accordingly, upon storing the transaction 102*b* within a leaf node of the partition 117*a*, the data aggregation service 115 can update the calculation of the value of aggregated data within the aggregation 131*f* and the parent aggregations 131 that reference the aggregation 131*f* in which the transaction 102*b* was stored. Calculating the value of the aggregated data within the parent aggregations 131 need only rely on the value of the aggregated data of their respective child aggregations 131 rather than the specific transactions 102 stored in the leaf nodes of the aggregation 131.

Figure 2:
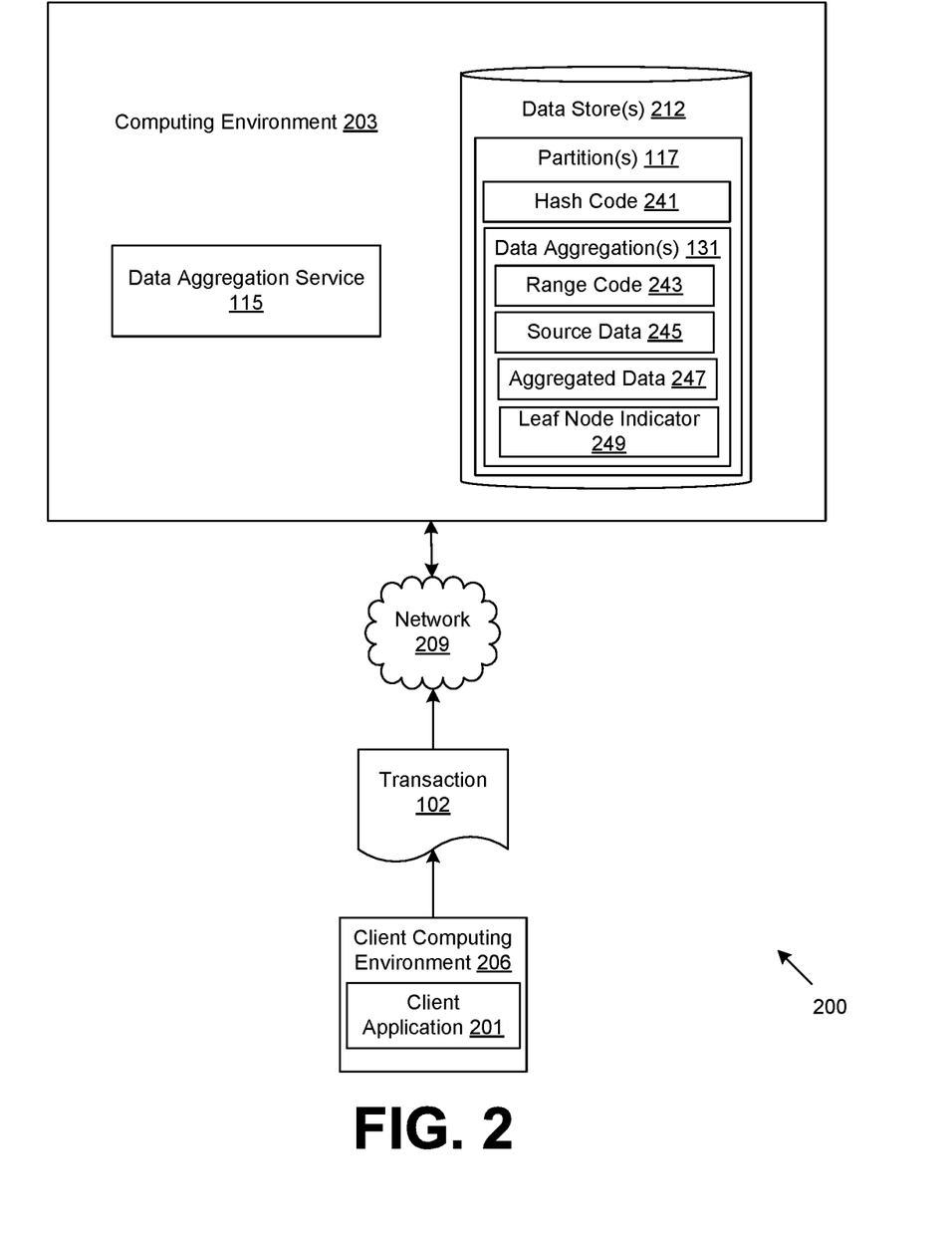
FIG. 2 is a block diagram of a networked environment according to various embodiments of the present disclosure.

With reference to FIG. 2A, shown is a networked environment 200 according to various embodiments. The networked environment 200 includes a computing environment 203 and one or more client computing environment 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 and client computing environment 206 can comprise, for example, a server computer or any other system providing computing capability. Alternatively, the computing environment 203 and client computing environment 206 can employ a plurality of computing devices that can be arranged, for example, in one or more server banks, computer banks, or other arrangements. Such computing devices can be located in a single installation or may be distributed among many different geographical locations. For example, the computing environment 203 and client computing environment 206 can include a plurality of computing devices that together can comprise a hosted computing resource, a grid computing resource, and/or any other distributed computing arrangement. In some cases, the computing environment 203 and client computing environment 206 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a data aggregation service 115, and other applications, services, processes, systems, engines, or functionality not discussed in detail herein. The data aggregation service 115 can receive transactions 102 from a client application 201. Transactions 102 can correspond to transactions processed by a payment system, an e-commerce platform, a virtual currency platform, or any other transaction processor. The client computing environment 206 can be an upstream system that processes transactions 102 and provides a copy of the transactions 102 to the data aggregation service 115 for calculating data aggregations 131.

The data stored in the data store 212 includes, for example, one or more partitions 117 in which transactions 102 are stored by or housed. The data store 212 can comprise a non-relational or "NoSQL" database that is configured to provide high transaction throughput and scalability. In some examples, a relational database can be used, as can a high performance non-relational database employed to store the current value of a stored value to provide for high speed reads and writes for the current value of the stored value.

The various partitions 117 can include transaction data and aggregations 131 that represent aggregations of underlying transaction data. Each partition 117 can be referenced by a hash code 241 that uniquely identifies a particular partition 117 with respect to other partition 117 in the data store 212. For example, a hash code 241 identifying the partition 117 can represent a user or customer identifier.

As noted above, data aggregations 131 represent collections of transaction data that can be extracted from transactions 102 obtained from the client application 201. A data aggregation 131 can represent a construct or data structure in the data store 212 that houses such data related to transactions 102. For example, a particular data aggregation 131 can contain aggregated data about periodic transaction volume received by the data aggregation service 115. A particular data aggregation 131 can include summed or totaled data based upon individual transaction data over a particular time period. Counted, mix, max, average, Each aggregation 131 can be associated with one or more range codes 243. A range code 243 can identify a time period that defines the aggregation 131 so that the data aggregation service 115 can query the particular aggregation 131 by the time period covered by the aggregation 131. In one example, a range code 243 can include a start time and time period or time duration defining the time period that are concatenated together in a string or alphanumeric identifier. For example, referring back to FIG. 1A, aggregation 131*a* has a range code of "1h|2016-01-05T00:00:00." This range code 243 has a format that identifies one hour as the time period and then a date and time that specifies the start time of the time period defining the aggregation 131*a*.

In some examples, the range code 243 can include other data concatenated to a time period and/or start time that can be used to further categorize or filter the time period or data within the aggregation 131. For example, the range code can include tags that specify whether the transaction data calculated into the values associated with the aggregation are credit card transactions, swiped card transactions, keyed-in transactions, cash transactions, or any other categorization or tag associated with the transaction data as can be appreciated.

The source data 245 represents data corresponding to the underlying transactions 102 received from an upstream system that are aggregated by the data aggregation service 115. The source data 245 for leaf nodes, or nodes that do not identify a child node or child aggregation 131, represents transactions 102. In other words, the transactions 102 can be stored as source data 245 in aggregations 131 that have the smallest time period or smallest configured granularity. In aggregations 131 within a partition 117 that are not leaf nodes, the source data 245 can represent references to child nodes, or other aggregations 131 from which transactions 102 are aggregated or collected to form the source data 245 of a parent aggregation 131.

In some examples, the source data 245 can include an idempotency key or a unique identifier that ensures transaction idempotence within the data store 212. For example, the upstream system providing the transaction 102 can insert a globally unique identifier or any other form of idempotency key into the transaction 102, which can be stored in the source data 245 within an aggregation 131. The data aggregation service 115, prior to storing a particular transaction 102 within the data store 212, can verify that the idempotency key is not already present in an aggregation within the partition 117. In some examples, some form of optimistic concurrency control or versioning can be in place so that transaction data does not get stored in a particular aggregation 131 more than once or that transactions are not counted more than once when calculating aggregations 131.

Aggregated data 247 represents, for parent nodes, references to child nodes, or other aggregations 131 that make up the data that should be aggregated to form a particular aggregation 131. Aggregated data 247 can also represent values that are calculated by the data aggregation service 115 by aggregating the underlying source data 245. For example, for an aggregation 131 associated with a particular hour, the aggregated data 247 can represent totaled data extracted from fields of the underlying source data 245, such as total sales, total tax, total quantity, or any other fields from the source data 245 that are configured to be summed or totaled into the aggregated data 247. In the case of a leaf node, the data aggregation service 115 can calculate one or more values for the aggregated data 247 by totaling one or more fields from the source data 245 and storing the totaled values as aggregated data 247. In some examples, the aggregated data 247 for a leaf node can identify the parent nodes that are dependent upon the aggregated data 247 of the leaf node.

In the case of a parent node, the aggregated data 247 can reference one or more child nodes that should be included within the aggregated data 247 of the aggregation 131. For example, if a particular aggregation 131 includes a particular day's transactions, the aggregated data 247 includes references or pointers to the underlying hourly or minute-by-minute aggregations 131 depending upon which is the closest configured granularity having a smaller time period within the partition 117. In this way, in order to arrive at aggregated data 247 for a daily aggregation 131, for example, the data aggregation service 115 need only total the underlying source data 245 once, and for parent nodes, the data aggregation service 115 can rely upon the aggregated data 247 from the child nodes referenced by the parent nodes.

A leaf node indicator 249 indicates whether a particular aggregation 131 corresponds to a leaf node. The leaf node indicator 249 can be a Boolean indicator. If a particular aggregation 131 is a leaf node, the transactions 102 that correspond to a time period specified by the range code 243 can be stored in the aggregation 131. Additionally, the data aggregation service 115 can locate leaf nodes using the leaf node indicator 249 in order to calculate aggregated data 247 for leaf nodes and parent nodes of the leaf node in an efficient manner. In some implementations, a leaf node indicator 249 might not be used to identify leaf node aggregations 131. For example, a leaf node can be identified by determining whether the aggregation 131 is linked to any child nodes. In another example, a leaf node can be identified by determining whether the aggregation 131 contains specific transaction data, which indicates that the aggregation 131 is a leaf node.

The client computing environment 206 can execute a client application 201 that can process transactions that result in transactions 102 that are submitted to the data aggregation service 115 via the network 209. In this sense, the client application 201 is any application or service that can submit transactions 102 to the data aggregation service 115 that should be contemplated when calculating aggregated data 247 for aggregations 131. In some examples, the client application 201 can embed an idempotency code or a unique identifier into a transaction 102 so that the data aggregation service 115 can maintain transaction idempotency for the source data 245 in the various partitions 117. The transaction 102 can also include a hash code that identifies the correct partition 117 into which a particular transaction 102 should be stored by the data aggregation service 115.

Figure 3:
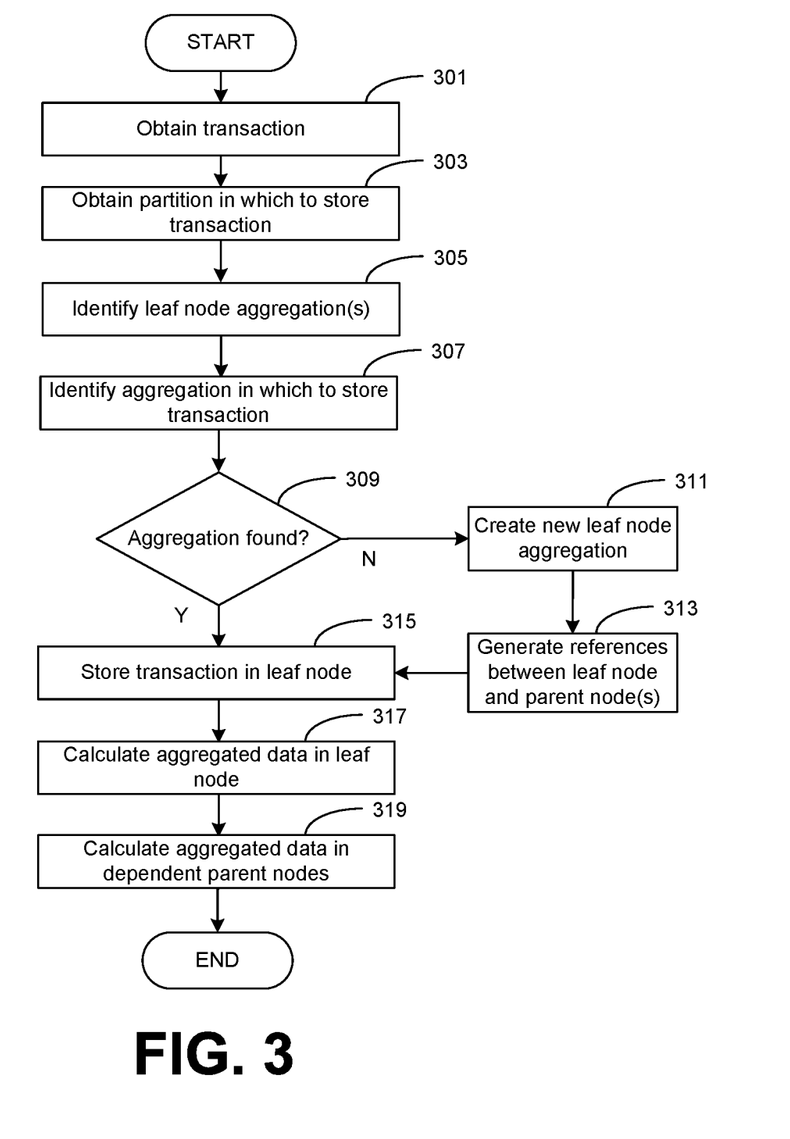
FIG. 3 is a flow chart illustrating examples of functionality implemented as portions of a computing environment in the networked environment of FIG. 2 according to various embodiments of the present disclosure.

Referring next to FIG. 3, shown is a flowchart that provides one example of the operation of a portion of the data aggregation service 115 according to various embodiments. It is understood that the flowchart of FIG. 3 provides merely an example of the many different types of functional arrangements that may be employed to implement the operation of the portion of the data aggregation service 115 as described herein. As an alternative, the flowchart of FIG. 3 can be viewed as depicting an example of elements of a method implemented in the computing environment 203 according to one or more embodiments. FIG. 3 illustrates an example of how the data aggregation service 115 can store a transaction 102 within a partition 117 can calculate aggregated data 247 based upon the transaction 102.

Beginning with box 301, the data aggregation service 115 can obtain a transaction 102 from a client application 201. The client application 201 can be an upstream transaction processor that stores or processes a transaction and forwards the transaction to the data aggregation service 115 for calculating data aggregations 131 that depend upon data in the transaction 102. At box 303, the data aggregation service 115 can determine which partition 117 within the data store 212 that the transaction 102 should be stored. The data aggregation service 115, in some examples, can make this determination by identifying a hash code 241 from the transaction data that corresponds to a particular partition 117. The hash code 241 can uniquely identify a particular partition 117 with respect to other partitions 117 in the data store 212. In some examples, a certain user or account within the data store 212 can correspond to multiple partitions 117 containing data aggregations 131, and the hash code 241 can facilitate differentiation between the partitions 117 associated with the user or account.

At box 305, the data aggregation service 115 can identify the leaf node data aggregations 131 within the partition 117. The leaf node data aggregations 131 can be identified by the leaf node indicator 249 flag that can be set for the various aggregations 131 within the partition 117. In some examples, the leaf node data aggregations 131 can be identified via a configuration or rule-based mechanism and not through use of a leaf node indicator 249. As noted above, leaf node data aggregations 131 are data aggregations 131 within a partition 117 that are associated with the smallest time period, or the lowest configured granularity. In one example, all other data aggregations 131 in the partition 117 can have time periods that are multiples of the time period of the leaf node data aggregations 131. The transaction 102 is stored in one of the leaf node data aggregations 131 and not in a parent node or parent aggregation 131 that references a child aggregation 131 within its respective aggregated data 247.

At box 307, the data aggregation service 115 identifies one of the leaf node aggregations 131 in which to store the transaction 102. The data aggregations service 115 can make this determination based upon the time period and start time specified by the various aggregations 131. The data aggregation service 115 can determine which time period of an aggregation that a timestamp of the transaction 102 falls within and identify the aggregation 131 as the storage location of the transaction 102. In some examples, the data aggregation service 115 can also perform an idempotency check to avoid storing the transaction 102 in the partition if it has previously been stored and accounted in the aggregated data 247. In one scenario, the data aggregation service 115 can determine whether an idempotency key or transaction identifier within the transaction 102 is already present within the partition 117. If the transaction 102 is already present, the data aggregation service 115 can avoid storing the transaction 102 again. In some examples, the data aggregation service 115 can go ahead and store duplicate transactions 102 within the partition and maintain transaction idempotence by accounting for duplicate transactions 102 when calculating the aggregated data 247 for the respective leaf node data aggregations 131.

At box 309, if no aggregation 131 corresponding to the timestamp of the transaction is found, the process proceeds to box 311, where the data aggregation service 115 can create a new leaf node aggregation 131 by generating an aggregation with the same time period as the other leaf nodes. The start time of the newly created aggregation 131 can be selected based upon the timestamp of the transaction 102.

At box 313, the data aggregation service 115 can create references between the newly created leaf node data aggregation 131 and the parent aggregations 131 that are dependent upon the newly created aggregation 131. In one example, the data aggregation service 115 can determine whether the time period defined by the parent aggregations 131 require a reference to the newly created aggregation 131. For example, if a parent aggregation 131 defines a particular day as its time period, the data aggregation service 115 would generate a reference from the parent aggregation 131 to the newly created aggregation 131 if the time period of the newly created aggregation 131 falls within the particular day.

If the aggregation 131 corresponding to the timestamp of the transaction 102 is found at box 309 or after the references between parent, child, and leaf aggregations 131 is generated at box 313, the process proceeds to box 315. At box 315, the data aggregation service 115 can store the transaction 102 in a leaf node data aggregation 131 that corresponds to the timestamp of the transaction 102. As noted above, the transaction 102 can be stored within the source data 245 of the aggregation 131.

Upon storing the transaction 102 in the aggregation 131, the process can proceed to box 317, where the data aggregation service 115 calculates aggregated data 247 in the leaf node in which the transaction was stored. The aggregated data 247 can be calculated by totaling the source data 245 or performing any other necessary calculations to arrive at one or more aggregated values from the underlying transaction or source data 245.

Next, at box 319, the data aggregation service 115 can calculate or update the aggregated data 247 in parent data aggregations 131 that are dependent upon the aggregation 131 in which the transaction 102 was stored and in which updated aggregated data 247 was calculated in box 317. For example, if a parent aggregation 131 corresponding to a particular day, week, or year is dependent upon the aggregation 131 for a particular hour within the day, week or year, the aggregated data 247 of the parent aggregation 131 can be updated based upon the updated aggregated data 247 within the leaf node aggregation 131. In some examples, updating the aggregated data 247 in the leaf node aggregation 131 and/or parent aggregations 131 can be performed on a periodic basis or in real-time as transactions 102 are received and stored in the data store 212.

Figure 4:
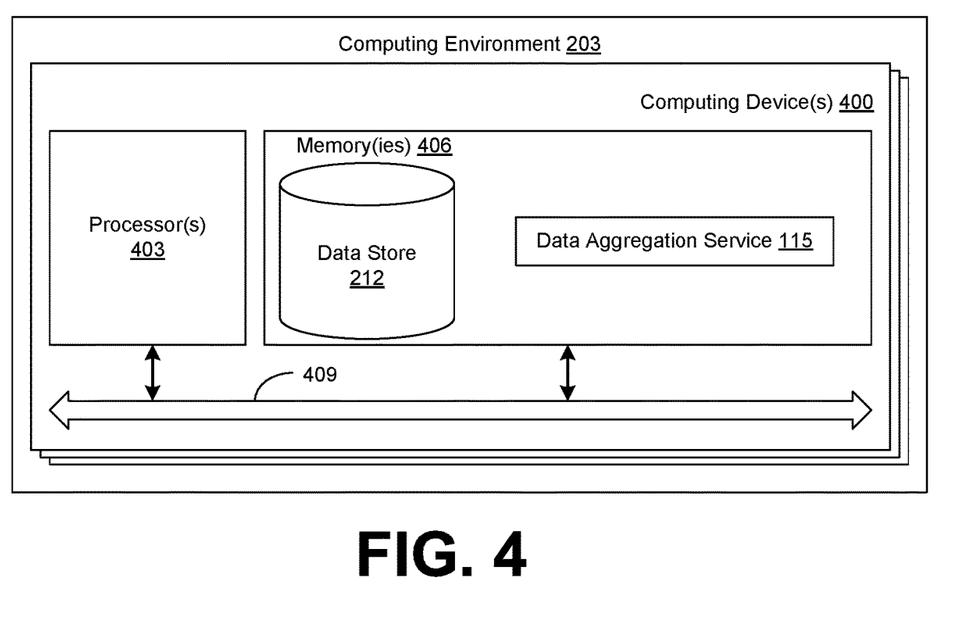
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the data aggregation service 115, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data aggregation service 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the data aggregation service 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation service 115, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data aggregation service 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   obtaining, via at least one computing device, a transaction corresponding to a partition in a data store, wherein the partition represents data associated with a particular user account, and the partition comprises a plurality of time series data aggregations, wherein each of the time series data aggregations identifies a time period and a start time, wherein the transaction further corresponds to at least one of a plurality of transactions processed by at least one of a payment system, an e-commerce platform, or a virtual currency platform;
   identifying, via the at least one computing device, a set of the time series data aggregations within the partition having a smallest time period;
   identifying, via the at least one computing device, one of the set of the time series data aggregations to assign the transaction based upon a timestamp of the transaction and a respective time period and a respective start time of the one of the data aggregations by determining whether the timestamp falls within the respective time period from the respective start time;
   storing, via the at least one computing device, the transaction in the one of the set of data aggregations in response to determining that the transaction has not already been stored in the partition;
   calculating, via the at least one computing device, a respective value for the one of the set of data aggregations;
   identifying, via the at least one computing device, respective parent aggregations of the one of the set of data aggregations, wherein the respective parent aggregations references at least one respective child aggregation; and
   calculating, for each of the respective parent aggregations, a respective value based upon the respective value of the at least one respective child aggregation.

2. The method of claim 1, further comprising generating a new data aggregation in response to a determination that the transaction cannot be assigned to any of the set of data aggregations based upon the respective time period and the respective start time.

3. The method of claim 1, wherein each of the time series data aggregations is associated with a range code, and the range code comprises a string including the time period concatenated to the start time.

4. The method of claim 1, wherein a parent data aggregation identifies at least one child data aggregation and a respective time period that is larger than a time period of the child aggregation.

5. The method of claim 1, wherein the transaction comprises an idempotency key, and determining that the transaction has not already been stored in the at least one of the set of data aggregations comprises verifying that an idempotency key associated with the transaction is not already stored within the partition.

6. A method, comprising:
   obtaining, via at least one computing device, a transaction associated with a partition in a data store, wherein the transaction is further associated with at least one of a plurality of transactions processed by at least one of a payment system, an e-commerce platform, or a virtual currency platform;
   identifying, via the at least one computing device, a set of leaf node data aggregations among a plurality of time series data aggregations associated within the partition having a smallest time period;
   identifying, via the at least one computing device, among the set of leaf node data aggregations, a time series data aggregation in which to store the transaction based upon a timestamp of the transaction and a respective time period associated with the time series data aggregation;
   storing, via the at least one computing device, the transaction in the data aggregation in response to determining that the transaction is not already stored in the partition;
   calculating, via the at least one computing device, a respective value associated with the aggregation;
   identifying, via the at least one computing device, at least one parent data aggregation of the data aggregation, the at least one parent data aggregation referencing the data aggregation; and
   calculating, via the at least one computing device, a respective value of the at least one parent data aggregation.

7. The method of claim 6, wherein identifying the aggregation further comprises determining whether the respective time period and a start time associated with the data aggregation corresponds to the timestamp.

8. The method of claim 6, wherein determining that the transaction is not already stored in the data aggregation further comprises determining whether an idempotency key associated with the transaction is already represented within the partition.

9. The method of claim 6, wherein the respective value of a parent data aggregation from the plurality of time series data aggregations is calculated by summing the respective value of at least one child data aggregation of the parent data aggregation.

10. The method of claim 6, further comprising generating a new leaf node data aggregation in response to a failure to identify the time series data aggregation in which to store the transaction.

11. The method of claim 6, wherein the at least one respective parent data aggregation is referenced by another parent data aggregation, and a value of the other parent data aggregation includes the respective value of the at least one respective data aggregation.

12. The method of claim 6, wherein each of the plurality of time series data aggregations is associated with a range code.

13. The method of claim 12, wherein the range code comprises a start time and a duration of the respective time period.

14. The method of claim 13, wherein identifying the at least one time series data aggregation in which to store the transaction further comprises extracting the start time and the duration from the range code and determining whether the timestamp falls within the respective time period.

15. The method of claim 6, wherein each of the set of leaf node data aggregations comprises source data in which transactions are stored and aggregated data based upon transaction data of the transactions.

16. The method of claim 6, wherein a parent data aggregation comprises aggregated data based upon transaction data of underlying transactions stored in respective child data aggregations, wherein the parent data aggregation does not contain the underlying transaction data.

17. A system comprising:
   at least one computing device; and a data aggregation service executed by the at least one computing device, the data aggregation service, when executed, causing the at least one computing device to at least:

obtain a transaction from an upstream computing environment, the transaction containing a transaction identifier, wherein the transaction corresponds to at least one of a plurality of transactions processed by at least one of a payment system, an e-commerce platform, or a virtual currency platform;

identify a partition within a data store corresponding to the transaction, the partition further corresponding to a plurality of time series data aggregations;

determine whether the transaction identifier is already represented within the partition;

identify a set of leaf node data aggregations among the plurality of time series data aggregations associated within the partition having a smallest time period;

identify one of the leaf node data aggregations that corresponds to a timestamp associated with the transaction based upon a time period defined by the leaf node;

store the transaction within the one of the leaf node data aggregations; and calculate aggregated data associated with the leaf node data aggregation.

18. The system of claim 17, wherein the data aggregation service is configured to calculate aggregated data associated with a parent aggregation that references the leaf node, where the aggregated data of the parent aggregation is based upon the aggregated data associated with the set of leaf node data aggregations.

19. The system of claim 17, wherein the data aggregation service is configured to generate a new leaf node data aggregation in response to determining that the timestamp fails to correspond to the time period specified by any of the set of leaf node data aggregations.

20. The system of claim 19, wherein the data aggregation service is configured to generate a reference to the new leaf node in at least one parent data aggregation associated with a time period that corresponds to the timestamp.

* * * * *